(12) United States Patent
Ma et al.

(10) Patent No.: US 8,066,521 B2
(45) Date of Patent: Nov. 29, 2011

(54) ELECTRONIC DEVICE WITH MULTIPLE USB PORTS

(75) Inventors: Xian-Wei Ma, Shenzhen (CN); Ting Luo, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/912,760

(22) Filed: Oct. 27, 2010

(65) Prior Publication Data

US 2011/0228495 A1    Sep. 22, 2011

(30) Foreign Application Priority Data

Mar. 16, 2010 (CN) .................. 2010 1 0125316.5

(51) Int. Cl.
*H01R 13/44* (2006.01)
*H01R 13/60* (2006.01)

(52) U.S. Cl. ............................................ 439/131

(58) Field of Classification Search .................. 439/131, 439/170, 171, 172, 528, 638
See application file for complete search history.

(56) References Cited

U.S. PATENT DOCUMENTS

| 7,125,265 | B2 * | 10/2006 | Weng ............................ 439/131 |
| 7,255,582 | B1 * | 8/2007 | Liao ............................... 439/165 |
| 2010/0317203 | A1 * | 12/2010 | Tracy et al. ................... 439/131 |

* cited by examiner

*Primary Examiner* — Hae Moon Hyeon
(74) *Attorney, Agent, or Firm* — Altis Law Group, Inc.

(57) ABSTRACT

An electronic device includes a main body, a circuit board, a receiving space defined in one side of the main body, a plurality of USB ports and a driving module. The receiving space includes a plurality of sets of fixed contacts on a bottom thereof, and the fixed contacts are electrically connected to the circuit board in the main body. The plurality of USB ports are slidably received in the receiving space, and each USB port comprises a set of external contacts. The driving module is configured to push one of the USB ports to a first position, wherein the USB port is able to slide from the first position to a second position where the set of external contacts of the USB port engages one of the plurality of sets of fixed contacts, which electrically connects the one of the USB ports with the circuit board.

13 Claims, 7 Drawing Sheets

ELECTRONIC DEVICE WITH MULTIPLE USB PORTS

BACKGROUND

1. Technical Field

The present disclosure relates to Universal Serial Bus (USB) connection and, particularly, to an electronic device with multiple sliding USB ports.

2. Description of the Related Art

An electronic device, such as a notebook computer, often includes a number of USB ports in fixed positions. A large connector may interfere with neighboring plug connectors or ports due to the fixed spacing between the USB ports.

BRIEF DESCRIPTION OF THE DRAWINGS

The components in the drawings are not necessarily drawn to scale, the emphasis instead being placed upon clearly illustrating the principles of an electronic device with multiple USB ports. Moreover, in the drawings, like reference numerals designate corresponding parts throughout the several views.

DETAILED DESCRIPTION

Figure 1:
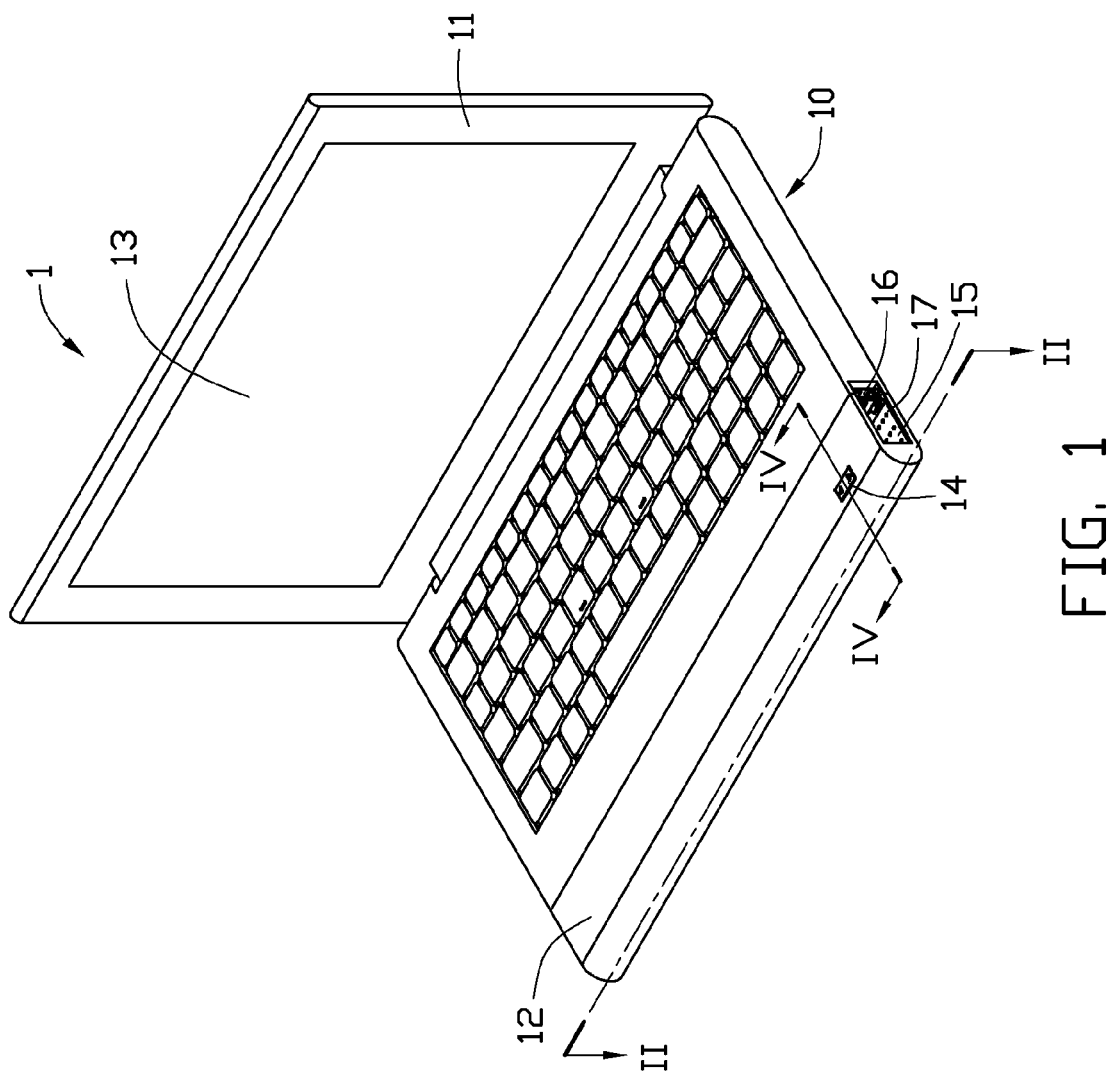
FIG. 1 is an isometric view of an electronic device with multiple USB ports, in accordance with an exemplary embodiment.

Referring to FIG. 1, an electronic device 1 includes a main body 10 including an upper cover 11 and a base 12, a display screen 13, a circuit board 17 mounted in the main body 10, and a number of USB ports 16. The display screen 13 is rotatably connected to the main body 10. A receiving space 15 is defined in one side of the base 12, and the USB ports 16 are received in the receiving space 15. In the embodiment, the electronic device 1 can be a notebook computer.

Figure 2:
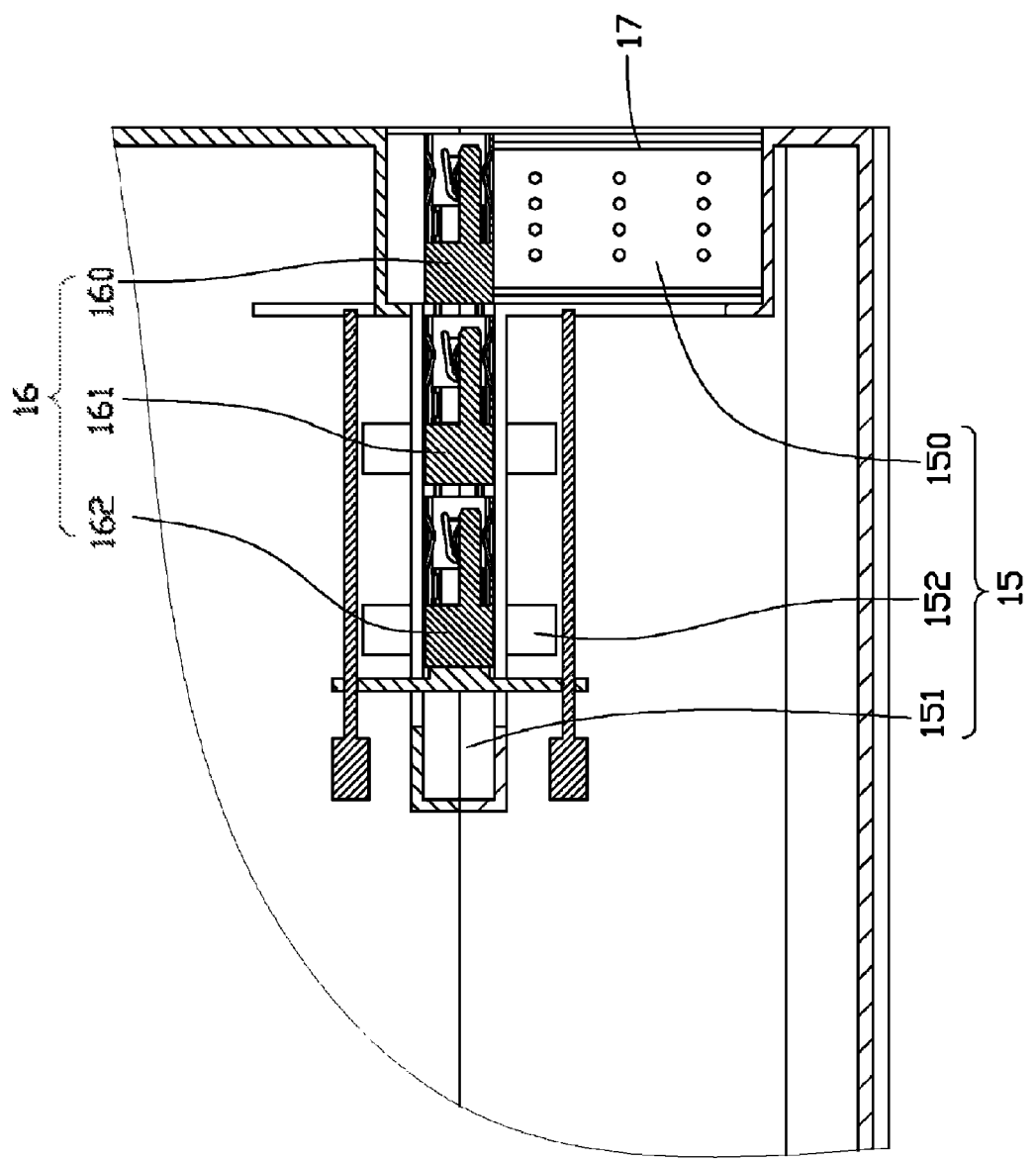
FIG. 2 is a partial, cross-section view of the electronic device of FIG. 1, taken along line II-II of FIG. 1.
Figure 3:
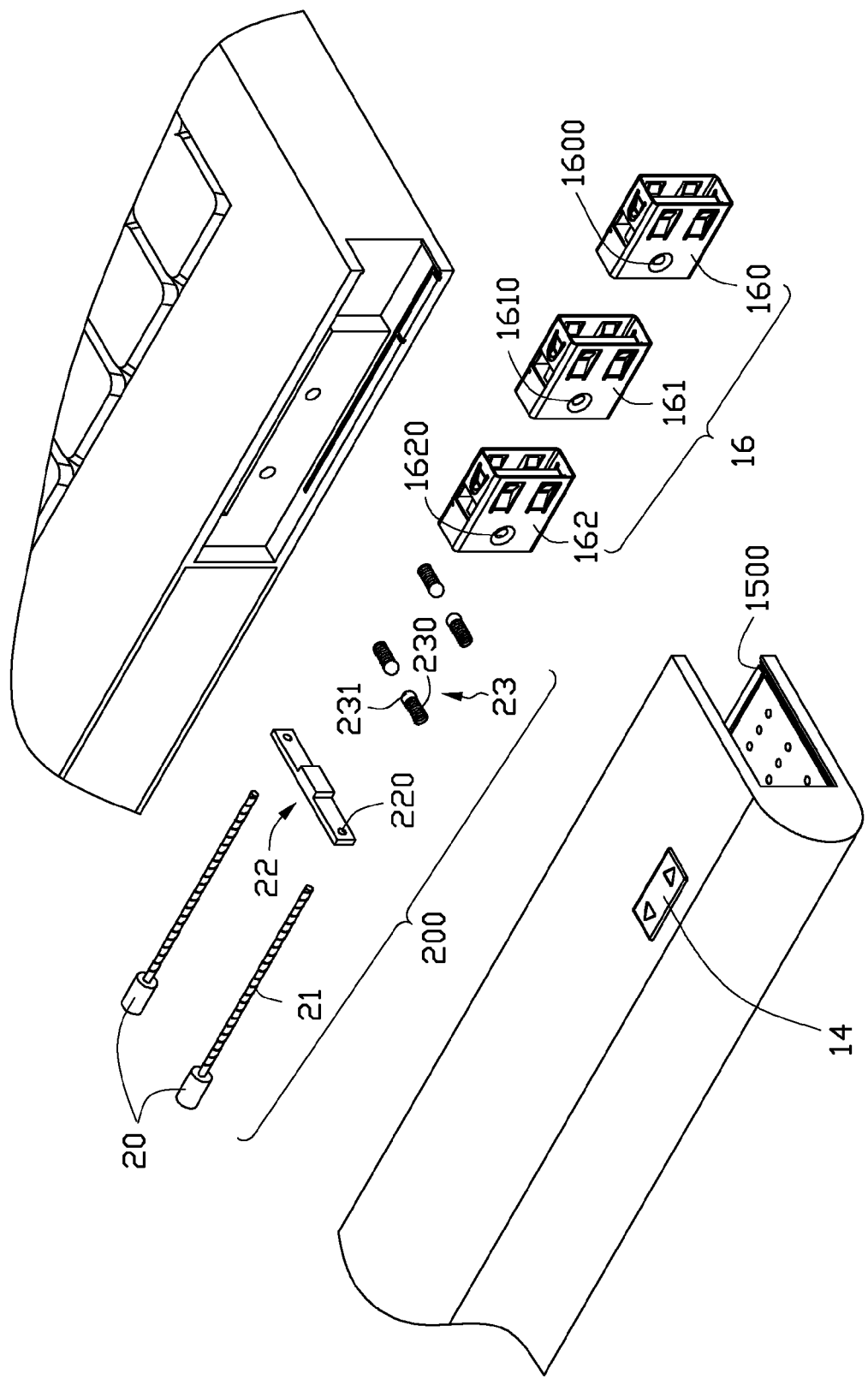
FIG. 3 is a partially exploded, perspective view of the electronic device of FIG. 1.
Figure 4:
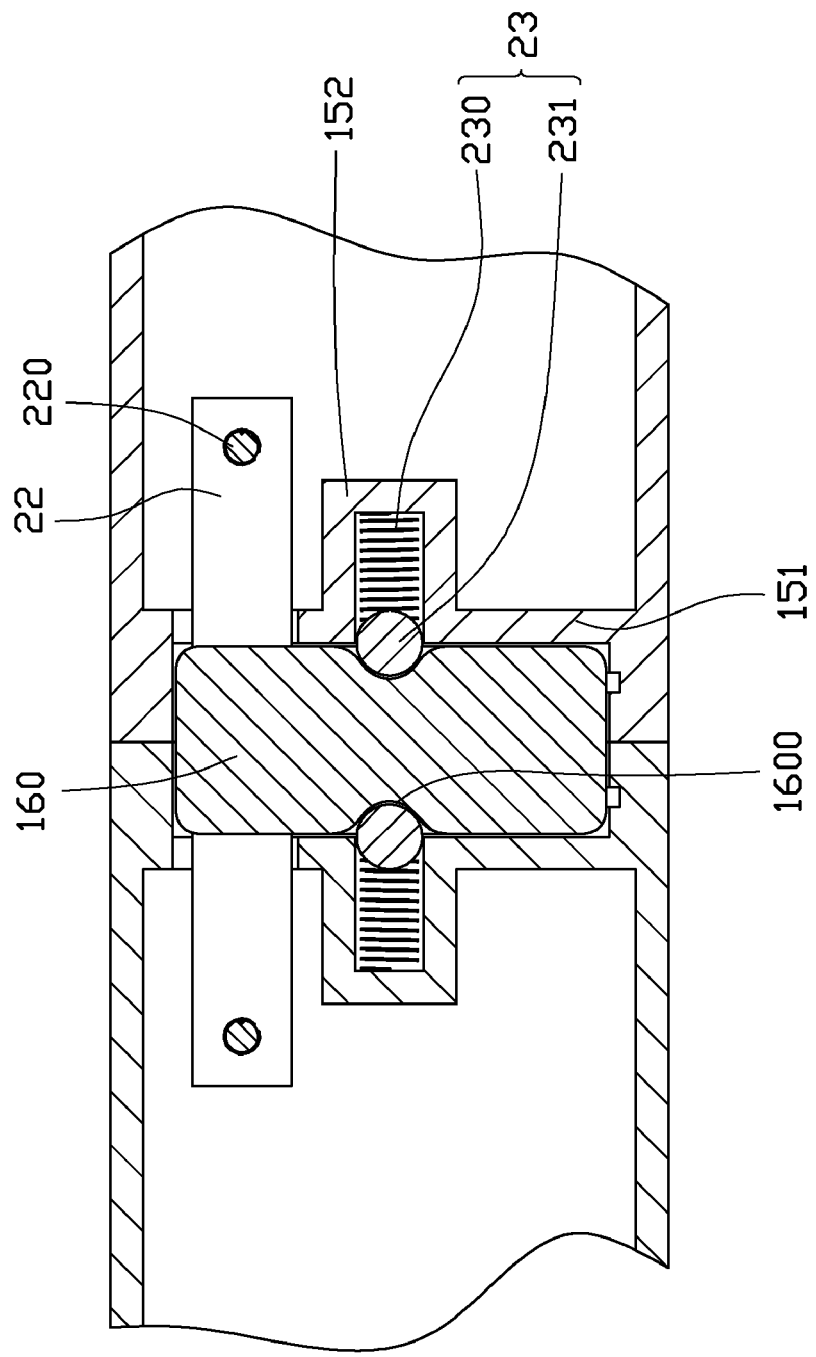
FIG. 4 is a partial, cross-section of the electronic device of FIG. 1, taken along line IV-IV of FIG. 1.

Referring to FIGS. 2-4, the receiving space 15 includes a closed first cavity 150, and a second cavity 151 perpendicular to the first cavity 150. One end of the first cavity 150 and that of the second cavity 151 are communicating with each other. The end of the first cavity 150 opposite to the end communicating with the second cavity 151 is opened. In the embodiment, the first cavity 150 is substantially perpendicular to the second cavity 151. A bar-shaped stopper member 1500 is arranged along the edge of a bottom of the first cavity 150, to prevent the USB ports 16 from disengaging from the first cavity 150.

The electronic device 1 further includes a driving module 200, configured to impel one USB port 16 to a position. The driving module 200 includes two motors 20 fixed in the closed end of the second cavity 151, a pair of threaded shafts 21 respectively connected to the motors 20, and a bar 22. A button 14 is mounted on the base 12, and can slide to two different positions to control the forward/reverse rotation of the motors 20. A pair of threaded holes 220 is defined in the bar 22. The threaded shafts 21 respectively extend through the threaded holes 220. The bar 22 is fixed to the ends of the threaded shafts 21. Each threaded shaft 21 can be driven by the respective motor 220 to rotate, which causes the bar 22 to slide along the threaded shafts 21.

In the embodiment, the USB ports 16 include a first USB port 160, a second USB port 161, and a third USB port 162. The USB ports 161 and 162 are received in the second cavity 151, while the first USB port 160 is received in the first cavity 150. The third USB port 162 resists one side of the bar 22. The second USB port 161 is in front of the third USB port 162, and the first USB port 160 is in front of the second USB port 161. The USB ports 160, 161, and 162 have the same configuration, and each defines a pair of recesses 1600, 1610, and 1620, respectively, at opposite sides thereof. In the embodiment, the receiving space 15 further defines two pairs of closed indentations 152 on the opposing walls of the second cavity 151 near to the end thereof which is communicating with the second cavity 151, and one end of each indentation is opened and communicating with the second cavity 151. Each of the USB ports 161 and 162 is held in position by a pair of elastic elements 23. Each of the pair of elastic elements 23 is received in the indentation 152. Specifically, each one of the pair of elastic elements 23 includes a fixed end 230 fixed in the end of an indentation 152 opposite to the end which is communicating with the second cavity 151, and an opposite free end 231 extended from the end of the indentation 152 communicating with the second cavity 151 is received in an recess 1610 or 1620. In this embodiment, each of the elastic elements 23 can be a coil spring, and the free end 231 is spherical.

Figure 5:
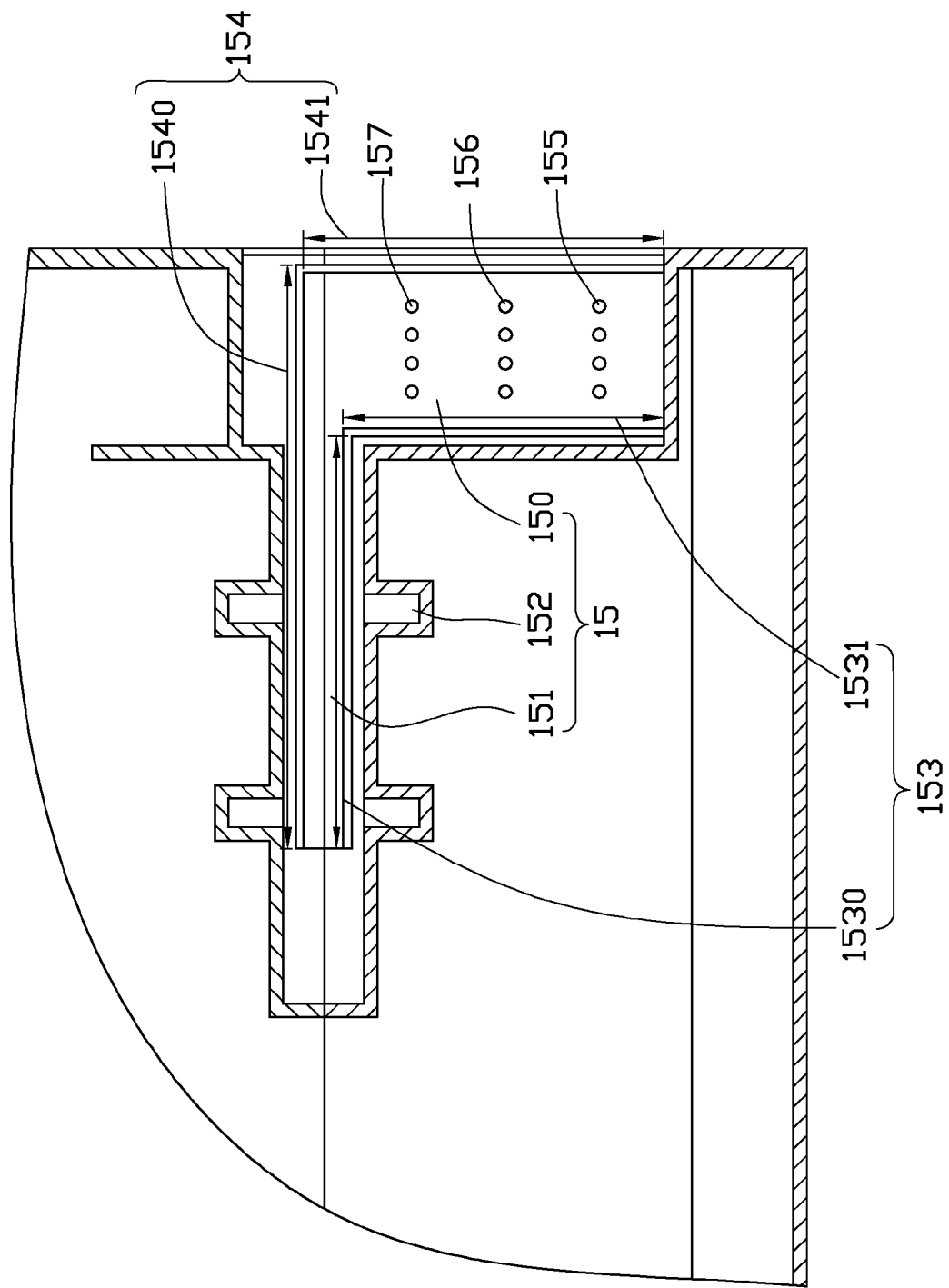
FIG. 5 is a view similar to FIG. 2, but only a partial, cross-section view of slide rails without USB ports of the electronic device of FIG. 1.
Figure 6:
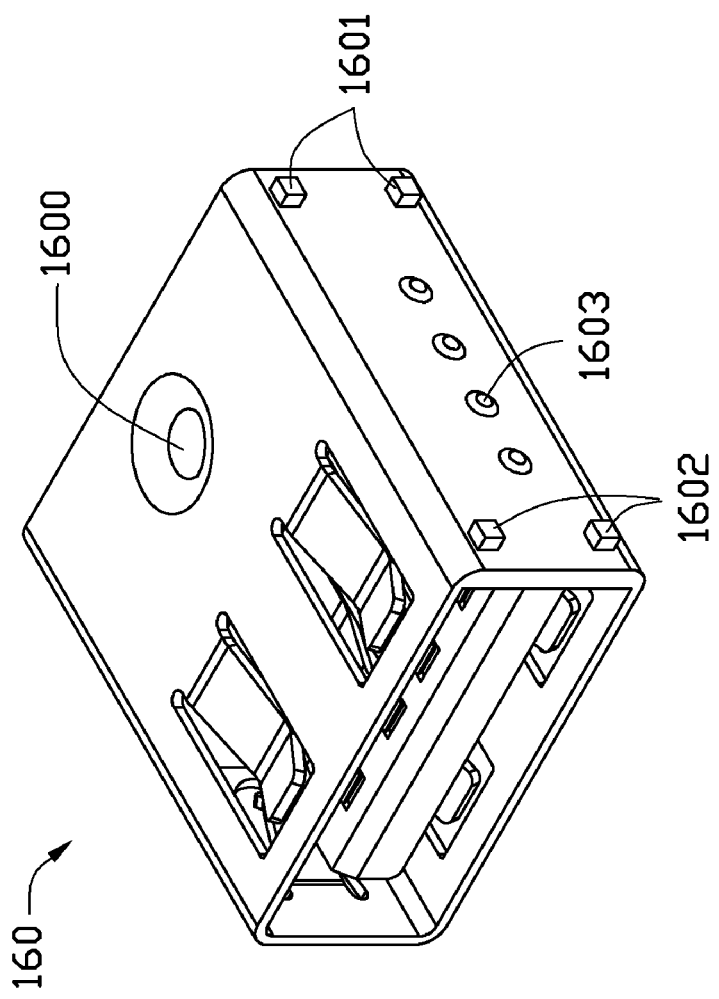
FIG. 6 is an isometric view of a USB port of the electronic device of FIG. 1.

Referring to FIGS. 5 and 6, a first sliding groove 153 and a second sliding groove 154 are defined in the bottom of the receiving space 15. The first sliding groove 153 includes a first horizontal portion 1530 and a first vertical portion 1531. The second sliding groove 154 includes a second horizontal portion 1540 and a second vertical portion 1541. The horizontal portions 1530 and 1540 are substantially parallel to each other. The vertical portions 1531 and 1540 are substantially parallel to each other. In this embodiment, a first pair of sliding protrusions 1601 and a second pair of sliding protrusions 1602 protrude from one sidewall of the first USB port 160. The first pair of sliding protrusions 1601 is received in the first vertical portion 1531, and the second pair of sliding protrusions 1602 is received in the second vertical portion 1541, allowing the first USB port 160 to slide along the vertical portions 1531 and 1541. Having the same sliding protrusions as the protrusions 1601 and 1602, the USB ports 161 and 162 can slide along the horizontal portions 1530 and 1540, and the vertical portions 1531 and 1541.

In the embodiment, a first set of fixed contacts 155, a second set of fixed contacts 156 and a third set of fixed contacts 157, which are concave, are formed in the bottom of the first cavity 150, and electrically connected to the circuit board 17 in the main body 10. The first USB port 160 includes a number of external USB contacts 1603 respectively and electrically connected to its internal contacts. The USB contacts 1603 are elastic, such that the contacts 1603 can connect snugly with the contacts 155, 156, or 157, which ensures the electrical connection between the first USB ports 160 and the circuit board 17 in the main body 10.

Figure 7:
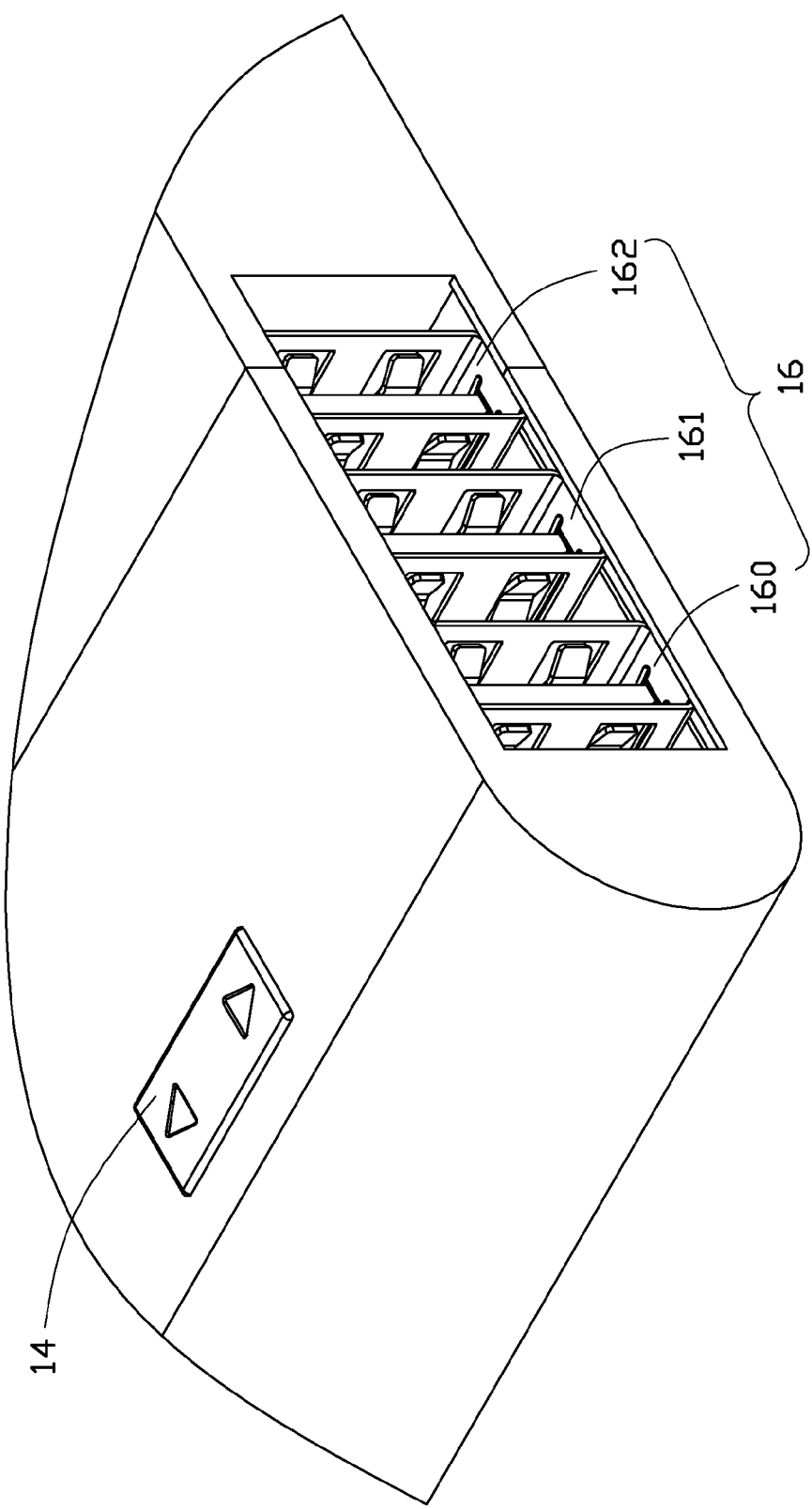
FIG. 7 is an isometric view of the electronic device of FIG. 1, showing all USB ports in exposed state.

Referring again to FIGS. 2 and 7, only the first USB port 160 is normally exposed and available for use. When needed, the first USB port 160 can be slid along the vertical portions 1531 and 1541 until the external USB contacts 1603 engage the fixed contacts 155 or 156. The button 14 can then be operated to actuate the motors 20, to cause the bar 22 to move outward. The USB ports 161 and 162 are pushed by the bar 22 and move outward along the horizontal portions 1530 and 1540, like the protrusions 1601 and 1602 received in the horizontal portions 1530 and 1540. When the USB port 161 is slid to the end of the horizontal portion 1530, keep on pushing the USB port 161 along the direction of the horizontal portions 1530 and 1540, like one of the protrusions 1602 which is received in the horizontal portion 1530 is now moving out of the horizontal portion 1530 and then received in the vertical portion 1541. Then, keep on sliding along the direction of the vertical portions 1531 and 1541, one of the protrusions 1601 which is received in the horizontal portion 1540 is now moving out of the horizontal portion 1540 and then received in the vertical portion 1531. Once the protrusions of the second USB port 161 are all respectively received in the vertical portions 1531 and 1541, like the protrusions 1601 and 1602 all received in the vertical portions 1531 and 1541, the second USB port 161 can then be slid along the vertical portions 1531 and 1541. Once the external contacts of the second USB port 161 stay engaged with the contacts 156, the USB port 161 is ready for use. Similar operation can be repeated to expose the USB port 162.

When the USB ports 161 and 162 are to be covered, the button 14 can be operated to reverse the motors 20 to move the bar 22 inward to its initial position. The third USB port 162 can be slid along the vertical portions 1531 and 1541 until the protrusions 1601 and 1602 are received in the horizontal portions 1530 and 1540. The third USB ports 162 are pushed inward along the horizontal portions 1530 and 1540, until being retained by the elastic elements 23. Similar operation can be repeated to push the second USB port 161 to its initial position.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a main body;
   a circuit board mounted in the main body;
   a receiving space defined in one side of the main body, and comprising a plurality of sets of fixed contacts on a bottom thereof, and the plurality of sets of fixed contacts being electrically connected to the circuit board in the main body;
   a plurality of USB ports slidably received in the receiving space, each of the plurality of USB ports comprising a set of external contacts; and
   a driving module configured to push one of the USB ports to a first position, wherein the one of the USB ports is able to slide from the first position to a second position where the set of external contacts of the one of the USB ports engages one of the plurality of sets of fixed contacts, which electrically connects the one of the USB ports with the circuit board.

2. The electronic device as recited in claim 1, wherein the external contacts are elastic, and used to connect snugly with the fixed contacts, which ensures the electrical connection between the USB ports and the circuit board in the main body.

3. The electronic device as recited in claim 1, wherein the receiving space comprises a closed first cavity and a second cavity.

4. The electronic device as recited in claim 3, wherein one end of the first cavity and that of the second cavity are communicating with each other, and the end of the first cavity opposite to the end communicating with the second cavity is opened.

5. The electronic device as recited in claim 3, wherein the first cavity is perpendicular to the second cavity.

6. The electronic device as recited in claim 3, wherein the number of the plurality of USB ports received in the second cavity is two, the receiving space further defines two pairs of closed indentations on the opposing walls of the second cavity near to the end communicating with the first cavity;
   each USB port defines a pair of recesses at opposite sides thereof;
   two pairs of elastic elements, each elastic element comprises a fixed end fixed in the end of one indentation which is opposite to the end communicating with the second cavity, and an opposite free end extended from the end communicating with the second cavity is received in one of the recesses to hold the USB port in position.

7. The electronic device as recited in claim 5, wherein each of the elastic elements is a coil spring, and the free end is spherical.

8. The electronic device as recited in claim 1, wherein the receiving space further comprises a first sliding groove and a second sliding groove defined in the bottom thereof.

9. The electronic device as recited in claim 8, wherein the first sliding groove comprises a first horizontal portion and a first vertical portion; the second sliding groove comprises a second horizontal portion and a second vertical portion; the first horizontal portion and the second horizontal portion are parallel to each other, and the first vertical portion and the second vertical portion are parallel to each other;
   a first pair of sliding protrusions and a second pair of sliding protrusions protrude from one sidewall of the USB port; the first pair of sliding protrusions are received in the first vertical portion, and the second pair of sliding protrusions are received in the second vertical portion, allowing the USB ports to slide along the first vertical portion and the second vertical portion.

10. The electronic device as recited in claim 1, wherein the driving module comprises:
   two motors fixed in the second cavity;
   a pair of threaded shafts respectively connected to the motors;
   a bar fixed to ends of the threaded shafts;
   wherein each threaded shaft can be driven by the respective motor to rotate, which causes the bar to slide along the threaded shafts.

11. The electronic device as recited in claim 10, wherein a pair of threaded holes is defined in the bar; the threaded shafts respectively extend through the threaded holes.

12. The electronic device as recited in claim 1, wherein a bar-shaped stopper member is arranged along the edge of the opened end on a bottom of the first cavity, and used to prevent the USB ports from disengaging from the first cavity.

13. The electronic device as recited in claim 1, wherein a button is mounted on the main body, and is operable to be slid to two different positions to control the forward and reverse rotation of the motors.

* * * * *